United States Patent [19]

Galt

[11] Patent Number: 5,070,685
[45] Date of Patent: Dec. 10, 1991

[54] HEDGE TRIMMER SUPPORT CARRIAGE

[76] Inventor: Edward R. Galt, 11002 Cedar Lane, Sidney, British Columbia, Canada, V8L 4R4

[21] Appl. No.: 651,154

[22] Filed: Feb. 6, 1991

[51] Int. Cl.⁵ .............................................. A01G 3/04
[52] U.S. Cl. ........................................ 56/16.7; 56/236; 56/237; 172/17
[58] Field of Search .................... 56/233, 12.1, 12.7, 56/17.2, 16.7, DIG. 8, DIG. 18, 234, 235, 236, 237; 172/13, 14, 15, 16, 17; 30/276

[56] References Cited

U.S. PATENT DOCUMENTS

| | | | |
|---|---|---|---|
| 1,930,934 | 10/1933 | Healy | 56/237 |
| 2,502,943 | 8/1946 | Gordon . | |
| 2,762,186 | 9/1956 | Janata | 56/233 |
| 2,913,058 | 11/1954 | Smith et al. . | |
| 3,703,803 | 11/1972 | McClure | 56/237 |
| 4,033,098 | 5/1975 | Green | 56/17.5 |
| 4,182,100 | 1/1980 | Letter | 56/16.7 |
| 4,442,659 | 4/1984 | Enbusk | 56/12.7 |
| 4,936,886 | 6/1990 | Quillen | 56/16.7 |

Primary Examiner—Terry L. Melius
Attorney, Agent, or Firm—Barrigar & Oyen

[57] ABSTRACT

A wheeled carriage for supporting a portable hedge trimmer for use as a ground foliage mower. The carriage includes a frame for supporting the hedge trimmer motor chasis and a bar extending laterally of the frame for releasably securing the hedge trimmer cutting blade in a generally horizontal orientation close to the ground surface.

11 Claims, 3 Drawing Sheets

HEDGE TRIMMER SUPPORT CARRIAGE

FIELD OF THE INVENTION

This application relates to a wheeled carriage for supporting a portable hedge trimmer for use as a ground foliage mower. More particularly, this application pertains to a carriage for removably supporting a hedge trimmer cutting blade in a generally horizontal orientation close to the ground surface.

BACKGROUND OF THE INVENTION

Portable gas or electric powered hedge trimmers are in widespread use. Such hedge trimmers typically consist of a compact chassis housing the gasoline or electric motor, an elongate cutting blade extending laterally from the motor chassis, and a pair of handles for securely grasping and maneuvering the tool. The cutting blade is usually a single or dual reciprocating blade between 15 and 30 inches in length. The orientation of the cutting blade may be adjusted by the operator by manually tilting the tool as desired. Hedge trimmers are usually not used to cut ground foliage since it is awkward for the operator to stoop for long periods of time to maintain the cutting blade in a horizontal orientation close to the ground surface.

Many sickle-type mowers are known in the prior art which are specifically adapted for cutting ground foliage, such as grass and weeds. U.S. Pat. No. 2,502,943 granted to Gordon on Apr. 4, 1950 discloses a combination hedge trimmer and lawn mower which consists of a wheel-supported frame and a reciprocating cutting blade removably mounted at the forward end of the frame. The gasoline or electric motor is supported on the frame rearwardly of the cutting blade. The Gordon frame is not, however, suitable for supporting a conventional hedge trimmer having an elongate cutting blade extending laterally from one side of a motor chassis.

U.S. Pat. No. 4,033,098 granted to Green on July 5, 1977, discloses a grass trimming apparatus consisting of an elongated frame which is longitudinally and laterally tiltable on a single wheel support. The motor and cutting unit assembly is mounted within the transverse confines of the frame at its forward end. The cutting unit includes a flexible cutting element, such as a rotating nylon cord, rather than a reciprocating cutting blade.

U.S. Pat. No. 4,936,886 granted to Quillen on June 26, 1990 discloses a wheel mounted string trimmer having a drive shaft which extends forwardly of the frame within an elongate tube. A gasoline engine is mounted on the frame at the rear end of the drive shaft and a trimmer head is mounted at the forward end of the drive shaft. The trimmer head may be adjusted to operate in a generally horizontal plane, a generally vertical plane, or in a number of different planes extending at an angle to the horizontal.

U.S. Pat. No. 4,182,100 granted to Letter on Jan. 8, 1990 also discloses a wheeled carrier for a ground foliage trimmer. The flexible line, rotary trimmer is positioned at one end of a swivelling support arm extending forwardly of the frame.

However, none of the prior art wheeled carriers reviewed above are adapted for removably supporting a conventional portable hedge trimmer having an elongate cutting blade extending laterally of a motor chassis. Accordingly, the need has arisen for a wheeled carriage specifically constructed to enable a portable hedge trimmer to be converted for use as a ground foliage mower.

SUMMARY OF THE INVENTION

In accordance with the invention there is provided a carriage for supporting a portable hedge trimmer having an elongate cutting blade extending from a motor chassis. The carriage includes a generally horizontally oriented frame having a front end and a rear end, a ground engaging wheel having an axle rigidly connected to the frame for supporting the frame for travel above the ground, a bar rigidly connected to the frame and extending laterally therefrom, handle bars connected to the frame rear end for steering the carriage, and releasable mounting means for removably mounting the hedge trimmer on the carriage such that the hedge trimmer motor chassis is supported by the frame and the hedge trimmer cutting blade is secured by the bar.

The releasable mounting means preferably comprises one or more brackets slidably adjustable along the length of the bar for receiving fasteners securing the hedge trimmer cutting blade. The brackets maintain the cutting blade at a vertical elevation equal or lower than the bar.

Preferably, the carriage also includes a ground engaging skid depending from the free end of the bar remote from the frame. In an alternative embodiment, a wheel rotatably mounted to the free end of the bar may be substituted for the skid.

The wheel axle is preferably connected to a rear portion of the frame and the bar is connected to the frame between the wheel axle and the frame front end.

The frame may have a generally rectangular outline defined by a pair of spaced-apart, longitudinally extending side bars rigidly connected at the frame front and rear ends by front and rear transverse braces. The wheel axle preferably extends between the frame side bars proximate to the frame rear end, thereby enabling the frame to be tilted about the axis of the axle by manipulating the handle bars. The bar and cutting blade may accordingly be inclined at an angle to the horizontal during the cutting operation.

The handle bars preferably consist of a pair of tubular bars integrally connected to the frame side bars and extending upwardly and rearwardly therefrom.

BRIEF DESCRIPTION OF THE DRAWINGS

In drawings which illustrate the preferred embodiment of the invention.

DETAILED DESCRIPTION OF THE PREFERRED EMBODIMENT

Figure 1:
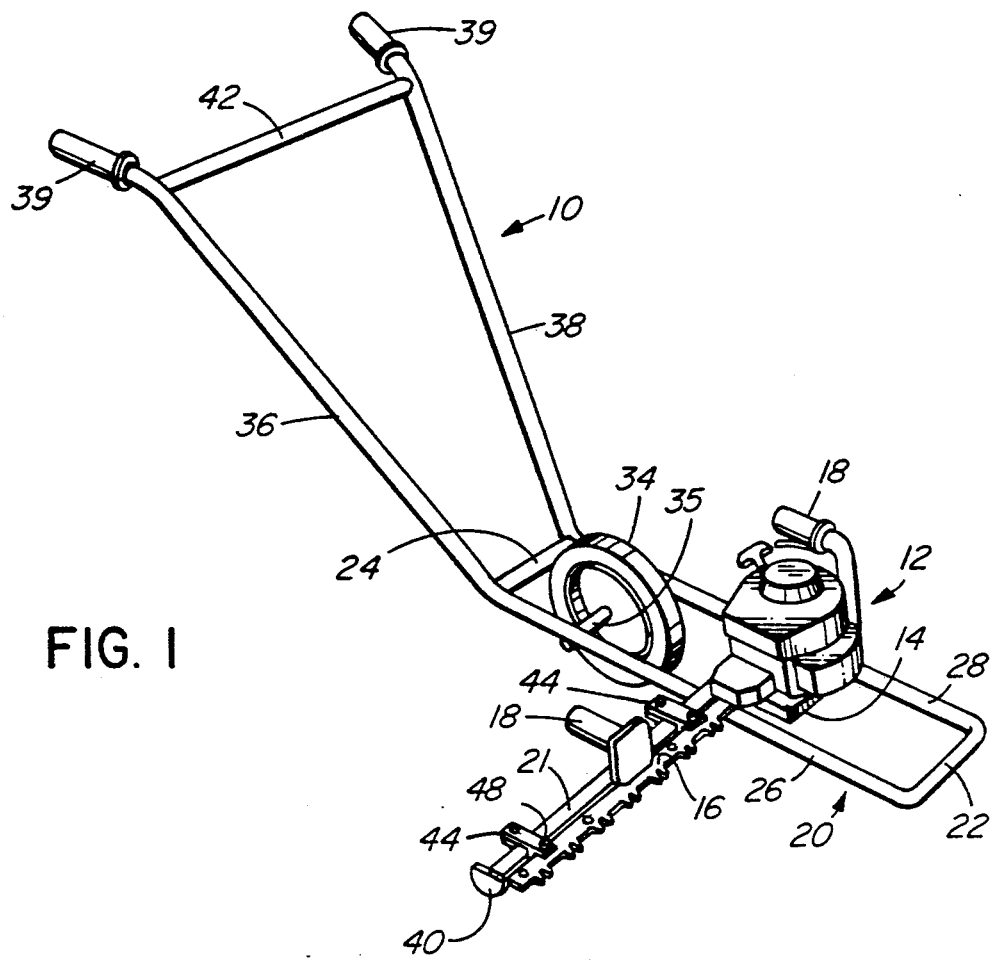
FIG. 1 is an isometric view of a conventional hedge trimmer mounted on the wheeled carriage of the present invention.

The present invention is directed to a wheeled carriage generally designated 10 which enables a portable hedge trimmer 12 to be converted for use as a ground foliage mower. Hedge trimmer 12 has a motor chassis 14 and an elongate, reciprocating cutting blade 16 extending laterally therefrom. A pair of handles 18 are provided for grasping and maneuvering hedge trimmer 12.

As shown in FIG. 1, carriage 10 includes a generally horizontally oriented frame 20 for supporting the hedge trimmer chassis 14, a laterally extending support bar 1 for securing the hedge trimmer cutting blade 16, and a pair of handle bars 36, 38 which extend upwardly and rearwardly from the rear end of frame 20 for steering carriage 10.

Figure 4:
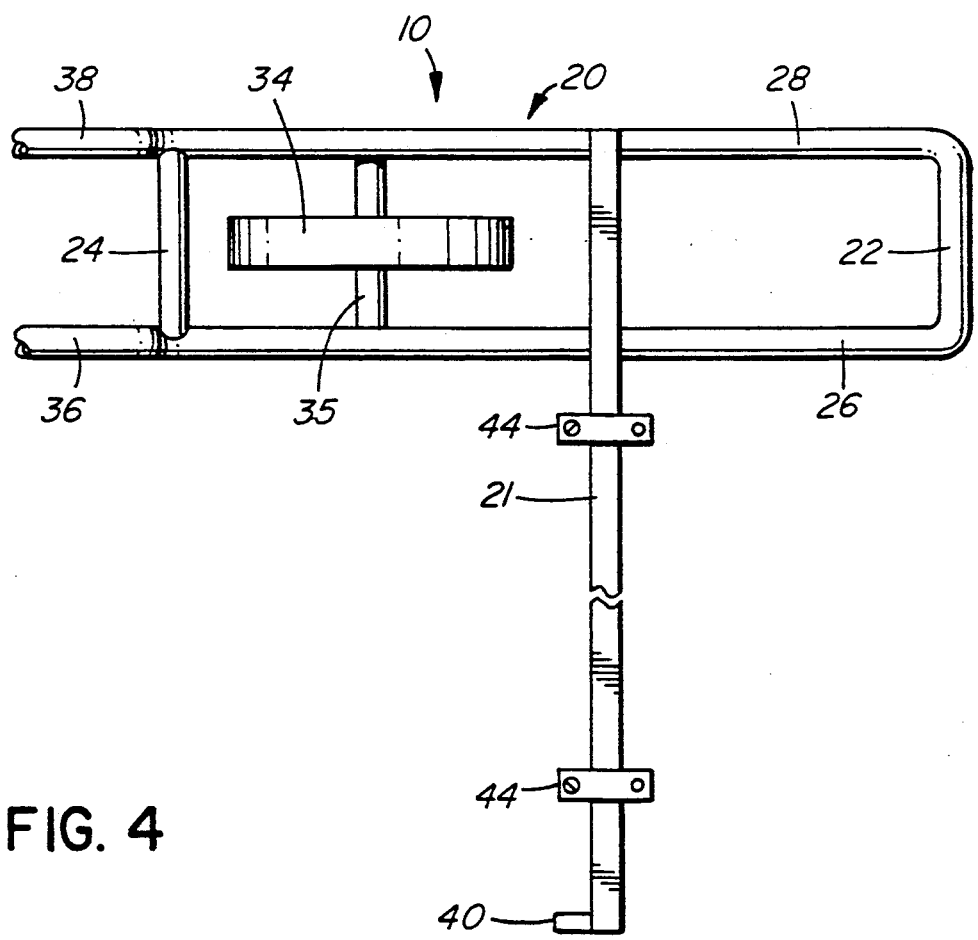
FIG. 4 is a plan view of the carriage of FIG. 1 with the hedge trimmer detached.

As shown best in FIG. 4, frame 20 preferably has a rectangular outline defined by a pair of spaced, longitudinally extending side bars 26, 28 which are rigidly connected at their front end by a transverse front brace 22 and that their rear end by a rear transverse brace 24. Frame 20 is supported above the ground by a single wheel 34 having an axle 35 which extends between side bars 26, 28 proximate rear brace 24.

Carriage 10 also includes "handle means"; namely, a pair of handle bars 36, 38 which are integrally connected to frame side bars 26, 28. Handle bars 36, 38 extend upwardly and rearwardly from frame rear brace 24 and terminate in a pair of horizontally oriented handle grips 39. Handle bars 36, 38 may be connected at their upper end by a cross-brace 42 as shown best in FIGS. 1 and 2.

With reference to FIG. 4, support bar 21 extends laterally from one side of frame 20. Bar 21 is rigidly connected to frame side bars 26, 28 at a position between wheel axle 35 and front brace 22.

The present invention further includes "releasable mounting means" for removably mounting hedge trimmer 12 to carriage 10. As shown best in FIGS. 4 and 5, the mounting means may consist of a pair of brackets 44 which are slidable along the length of support bar 21. Each bracket 44 has a pair of rearwardly extending flanges 45 which may be clamped or bolted together to secure bracket 44 at the desired longitudinal position. Each bracket 44 also has a forwardly extending flange 47 which is apertured to receive bolts passing through hedge trimmer cutting blade 16, as shown in the drawings. For example, selected bolts ordinarily used to secure hedge trimmer cutting blade 16 in place may be removed and replaced with slightly longer bolts 48 fastenable to bracket flange 47. Brackets 44 are preferably spaced apart at opposite ends of cutting blade 16 for maximum stability.

As should be apparent to someone skilled in the art, brackets 44 may be replaced with any other equivalent mounting means for releasably securing cutting blade 16 to support bar 21 at an elevation equal to or lower than bar 21.

Figure 2:
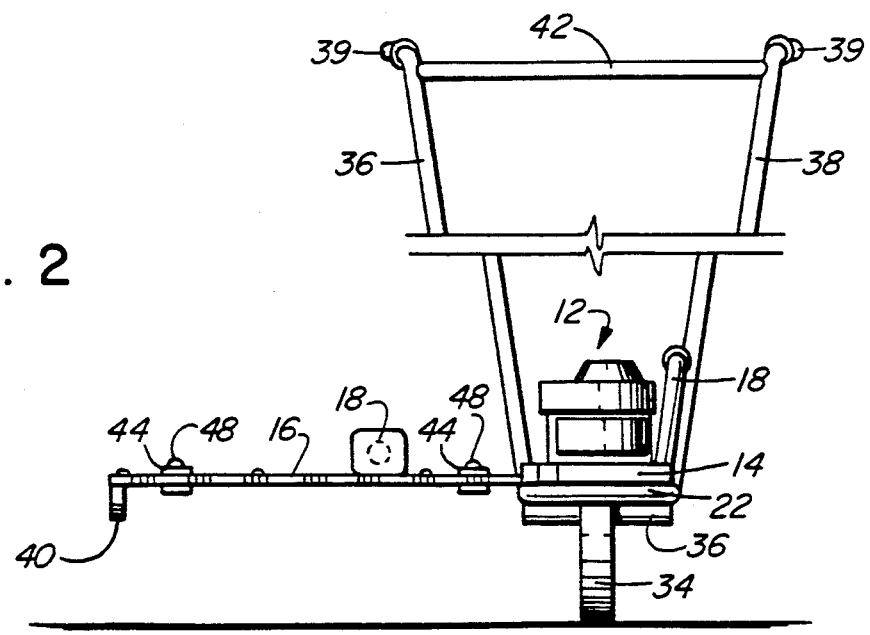
FIG. 2 is a fragmented, front elevational view of the hedge trimmer and carriage of FIG. 1.
Figure 3:
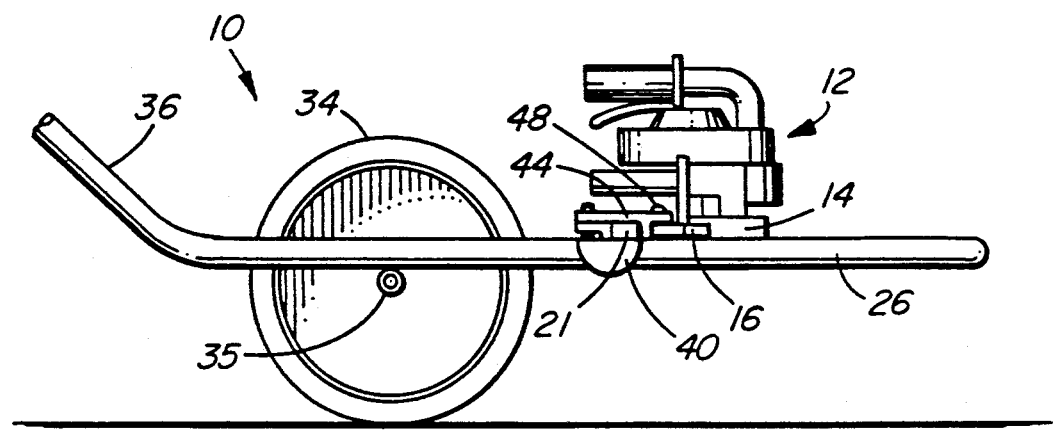
FIG. 3 is a fragmented, right side elevational view of the hedge trimmer and carriage of FIG. 1.

As shown best in FIGS. 1—3, a ground-engaging skid 40 depends from the free end of bar support 21 remote from frame 20. Skid 40 is provided to prevent bar 21, and hence cutting blade 16, from contacting rocks and the like during the mowing operation. In the embodiment shown in the drawings, skid 40 consists of a generally semi-circular member having an arcuate lower surface. Skid 40 is rigidly mounted flush with the forward surface of bar 21 so as not to restrict downward pivoting motion of frame 20 about wheel axle 35. In an alternative embodiment, skid 40 may be replaced with a ground-engaging wheel rotatably mounted at the end of bar 21.

Figure 5:
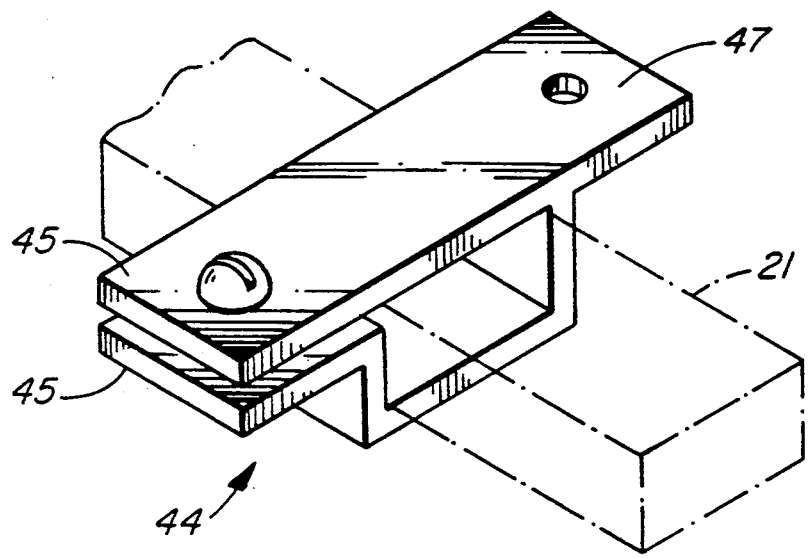
FIG. 5 is an enlarged, isometric view illustrating a bracket secured to the support bar of the present invention shown in phantom outline.

In operation, carriage 10 enables a portable hedge trimmer 12 to be converted for use as a ground foliage mower. Hedge trimmer 12 is mounted as shown in FIGS. 1-3 by placing motor chassis 14 on carriage frame 20 forwardly of wheel axle 35 and securing cutting blade 16 to support bar 21. In particular, brackets 44 may be slid along the length of support bar 21 and clamped at the desired longitudinal position by bolting bracket flanges 45 together (FIG. 5). As discussed above, cutting blade 16 may then be releasably secured to brackets 44 by replacing two of the standard size cutting blade bolts with slightly longer bolts 48. Each bolt 48 is inserted through an aperture located in the corresponding bracket flange 47 to brace cutting blade 16 forwardly of support bar 21.

Carriage 10 is constructed so that motor chassis 14, which constitutes the bulk of the hedge trimmer weight, is balanced evenly between the carriage frame front and rear ends 22, 24. This allows the operator to maneuver carriage 10 with comparatively little effort.

After hedge trimmer 12 has been securely mounted to carriage 10 as aforesaid, the user need only start the hedge trimmer motor to activate reciprocating cutting blade 16, grasp carriage handle grips 39, and push carriage 10 forwardly to cut a swathe through the ground foliage in question.

Skid 40 prevents support bar 21 and hence cutting blade 16 from contacting the ground during the cutting operation. As should be apparent from FIG. 1, frame 20 is readily tiltable about the axis of wheel axle 35 by manipulating handle grips 39. Thus, support bar 21 and cutting blade 16 may be inclined at an angle relative to the horizontal during the cutting operation to mow foliage of varying height. For example, by exerting upward pressure on handle grips 39, cutting blade 16 may be downwardly inclined to cut foliage very close to the ground surface.

At the end of the cutting operation, hedge trimmer 12 may be readily dismounted from carriage 10 by removing bolts 48 from bracket flanges 47. The bolt or clamp securing bracket flanges 45 together may also be removed to enable sliding adjustment of brackets 44. Thus carriage 10 may be readily adapted for use with different hedge trimmer models.

The inventor anticipates that the present invention could be sold to equipment rental shops and the like for use with their existing inventory of hedge trimmers. The invention would also be attractive to professional gardeners or individual property owners who must periodically mow sturdy ground foliage in addition to hedges.

Although the present invention has been described and illustrated with reference to a hedge trimmer 12 having a single reciprocating blade 16, it should be apparent that carriage 10 could also be adapted for use with hedge trimmers having dual reciprocating blades or double-sided blades. For example, brackets 44 may be extended to ensure that the rearwardly facing cutting blade does not contact support bar 21 during the cutting operation.

As should also be apparent to someone skilled in the art, carriage 10 may also include conventional ignition and throttle switches mounted on handlebars 36,38 or crossbrace 42 for remote control of hedge trimmer 12. For example, some city bylaws require that on/off switches be positioned within easy reach of the carriage handle grips 39 for safety reasons.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A carriage for supporting a portable hedge trimmer having a motor chassis and an elongate cutting blade extending therefrom, said carriage comprising:
   (a) a generally horizontally oriented frame having a front end and a rear end;
   (b) a ground engaging wheel having an axle connected to said frame for supporting said frame for travel above the ground;
   (c) handle means connected to said frame rear end for manually steering said carriage;
   (d) a bar rigidly connected to said frame and extending laterally therefrom; and
   (e) releasable mounting means for removably mounting said hedge trimmer to said carriage such that said chassis is supported by said frame and said cutting blade is secured by said bar.

2. A carriage as defined in claim 1, wherein said releasable mounting means comprises one or more brackets slidably adjustable along the length of said bar for receiving fasteners securing said cutting blade.

3. A carriage as defined in claim 1, further comprising a ground engaging skid depending from the end of said bar remote from said frame.

4. A carriage as defined in claim I, further comprising a second ground-engaging wheel rotatably mounted at the end of said bar remote from said frame.

5. A carriage as defined in claim 1, wherein said wheel axle is connected to a rear portion of said frame.

6. A carriage as defined in claim 5, wherein said bar is connected to said frame between said wheel axle and said frame front end.

7. A carriage as defined in claim i, wherein said releasible mounting means maintains said cutting blade at a vertical elevation equal to or lower than said bar.

8. A carriage as defined in claim 1, wherein said frame has a generally rectangular outline defined by a pair of spaced-apart, longitudinally extending side bars rigidly connected together at said frame front and rear ends by front and rear transverse braces.

9. A carriage as defined in claim 8, wherein said wheel axle extends between said frame side bars proximate said frame rear end, whereby said frame is tiltable about the axis of said axle by manipulating said handle means to incline said bar and said cutting blade at an angle to the horizontal.

10. A carriage as defined in claim 9, wherein said handle means comprises a pair of handle bars integrally connected to said frame side bars and extending upwardly and rearwardly therefrom.

11. A carriage for supporting a portable hedge trimmer having a motor chassis and an elongate cutting blade extending therefrom, said carriage comprising:
   (a) a generally horizontally oriented frame having a front end and a rear end, said frame having a generally rectangular out-line defined by a pair of spaced-apart, longitudinally extending side bars rigidly connected together at said frame front and rear ends by front and rear transverse braces;
   (b) a ground engaging wheel having an axle extending between said frame side bars proximate said frame rear end for supporting said frame for travel above the ground;
   (c) a pair of handle bars integrally connected to said frame side bars at said frame rear end and extending upwardly and rearwardly therefrom for manually steering said carriage;
   (d) a bar rigidly connected to said frame side bars between said wheel axle and said frame front end and extending laterally of the frame; and
   (e) releasable mounting means for removably mounting said hedge trimmer to said carriage such that said chassis is supported by said frame and said cutting blade is secured by said bar, said mounting means comprising at least one bracket slidably adjustable along the length of said bar for releasably fastening said cutting blade to said bar.

* * * * *

UNITED STATES PATENT AND TRADEMARK OFFICE
CERTIFICATE OF CORRECTION

PATENT NO. : 5,070,685

DATED : 10 December, 1991

INVENTOR(S) : Edward Ralph Gait

It is certified that error appears in the above-identified patent and that said Letters Patent is hereby corrected as shown below:

On the title page, under item [19], change "Galt" to read --Gait--; and item [76], change "Edward R. Galt" to read --Edward R. Gait--.

Signed and Sealed this

Twenty-fifth Day of May, 1993

Attest:

MICHAEL K. KIRK

*Attesting Officer*     *Acting Commissioner of Patents and Trademarks*